June 23, 1970 D. C. RIMLINGER 3,517,132

GATED AMPLIFIER CIRCUIT ARRANGEMENT FOR TIME DIVISION MULTIPLEX SWITCHING SYSTEM

Filed Jan. 25, 1968

INVENTOR
DONALD C. RIMLINGER

BY [signature]

ATTORNEY

United States Patent Office
3,517,132
Patented June 23, 1970

3,517,132
GATED AMPLIFIER CIRCUIT ARRANGEMENT FOR TIME DIVISION MULTIPLEX SWITCHING SYSTEM

Donald C. Rimlinger, Holcomb, N.Y., assignor to Stromberg-Carlson Corporation, Rochester, N.Y., a corporation of Delaware Filed Jan. 25, 1968, Ser. No. 700,402
Int. Cl. H04j 3/00
U.S. Cl. 179—15 3 Claims

ABSTRACT OF THE DISCLOSURE

A gated amplifier arrangement for a time division multiplex switching system. A pulse-type signal is amplified and fed to a temporary storage capacitor during a first time interval. It is then transferred by resonant transfer to a second capacitor during the next successive time interval and delivered to the TDM highway during a third interval. The energy presented initially at the input of the amplifier is delivered along with the amplified signal to the load.

BRIEF SUMMARY OF THE INVENTION

Figure 1:
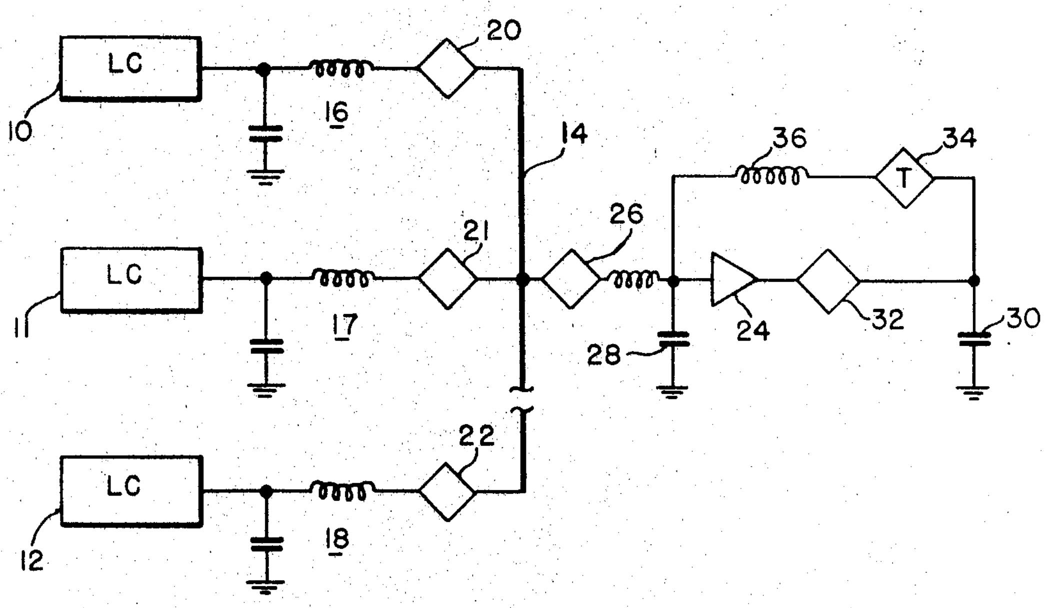

This invention relates to a novel gated amplifier arrangement to provide gain in a time division multiplex switching system, and, more particularly, to an arrangement of this type that requires only a minimum amount of circuitry, yet operates with a high degree of efficiency and reliability.

It is desirable in many cases to provide gain and directivity of signalling in TDM systems. The circuit of the invention achieves these functions at a substantial savings in equipment requirements relative to systems heretofore available or proposed, and with high efficiency, enabling a single amplifier to serve all of the lines connected to a TDM highway without the need for individual hybrids or amplifiers in each line circuit, and enabling switching on a two-wire basis.

Briefly, in accordance with the invention, an amplifier with a gated input and output is connected to a TDM highway, and a switching system is arranged to assign a series of three consecutive time slots for each communication channel, or connection to be effected. During the sampling period of the first time slot of the series, the input and output gates of the amplifier are enabled simultaneously with the line gate between the first line in the connection and the highway. During this period, a capacitor at the input of the amplifier becomes charged to a voltage indicative of the voltage on the highway, and a capacitor at the output of the amplifier becomes proportionately charged to a voltage depending on the gain of the amplifier. At the end of the sampling period, the line gate and both the input and output gates of the amplifier are inhibited. During the immediately succeeding guard period, a transfer gate is opened, and the charge on the capacitor at the output of the amplifier is transferred by resonant transfer to the capacitor at the input of the amplifier. During the sampling period of the second time slot of the series, the transfer gate is inhibited, and the line gate of the second line circuit in the connection is enabled along with the input and output gates of the amplifier. During the immediately succeeding guard period, the transfer gate is again enabled while the other gates are inhibited, and the charge from the capacitor at the output of the amplifier is transferred to the capacitor at the input. The transfer gate is inhibited at the end of the guard period of the second time slot. During the sampling period of the third time slot, the line gate of the first line circuit is again enabled, and also the input and output gates of the amplifier. During the guard period of the third time slot, all of the gates are inhibited, and the highway and the capacitors may be clamped in accordance with conventional practice to insure the complete removal of charge from them to minimize cross-talk.

During the first time slot, information is received from the first line and amplified, and stored in amplified form on the input capacitor of the amplifier. During the second time slot, the information from the first line is transferred to the second line, and information from the second line is amplified and stored in amplified form on the input capacitor of the amplifier. During the third time slot, information from the second line is transferred to the first line, and the two-way connection has been completed. The sequence is repeated once in each time frame for each connection effected at the switching exchange.

One important feature of the invention relates to the use of the input capacitor of the amplifier for storing the amplified signal from the output capacitor. This results in a conservation of energy because the input energy is added to the output and not wasted. Moreover, the arrangement avoids the need for separate gates for discharging the input capacitor, which would otherwise be necessary to avoid cross talk problems.

DETAILED DESCRIPTION

Figure 2:
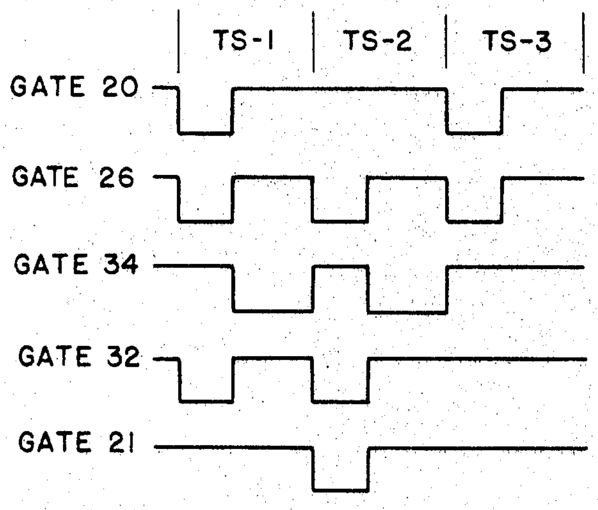

A presently preferred embodiment of the invention will now be described in conjunction with the accompanying drawing, wherein:

FIG. 1 is a schematic circuit diagram in block form showing the circuit arrangement of the invention, and FIG. 2 is a chart illustarting the synchronization of the various gates of the system to effect a single connection, or communication channel through the switching system.

As shown, plural line circuits 10, 11, and 12, only three of which are shown, but which would typically number twenty five to fifty, served by a switching exchange are connected to a TDM highway 14 through respective individual filters 16, 17, and 18 and gates 20, 21, and 22. The arrangement may be conventional except that no hybrid circuits are required in the line circuit connections. An amplifier 24 is connected to the highway through a gate 26, which may be called for convenience a sampling gate, and a capacitor 28 is connected at the input of the amplifier to be charged from the highway 14 when the sampling gate 26 is enabled. The output of the amplifier 24 is fed to a temporary storage capacitor 30 through another gate 32 called herein the isolating gate. A transfer gate 34 is connected between the input capacitor 28 and the temporary storage, or output capacitor 30 through an inductor 36, the value of which is chosen to effect resonant transfer of charge from the output capacitor 30 to the input capacitor 28 during the timing period for which the transfer gate 34 is enabled.

The gates are indicated in the drawing as diode quads, but they may be of any desired type, and they may be controlled by any desired circuit arrangement, several of which are known in the art and form no part of the present invention. The chart shown in FIG. 2 illustrates the synchronizing arrangement for the alternate enabling and inhibiting of the various gates for an exemplary channel effecting a connection between, for example, the first line circuit 10 and the second line circuit 11 in a typical TDM system using the conventional one microsecond time slot composed of 0.4 microsecond sampling period followed by a 0.6 microsecond guard period. Three consecutive time slots are used for each channel to provide directivity of signalling over the two-wire highway 14.

During the sampling period of the first time slot, the line gate 20 connected between the first line circuit 10 and the highway 14 is enabled, and also the sampling gate 26 and the isolating gate 32. During this sampling period, the input capacitor 28 becomes charged to a voltage indicative of the charge immediately preceding the sampling period on the capacitor of the filter 16 at the terminal of the first line 10. At the end of the sampling period of the first time slot, the line gate 20 and the gates 26 and 32 connected to the amplifier are inhibited. The transfer gate 34 is enabled during the guard period of the first time slot to affect resonant transfer of the charge from the output capacitor 30 to the input capacitor 28, and is inhibited at the end of the first time slot.

During the sampling period of the second time slot, the line gate 21 connected between the second line circuit 11 and the highway 14 is enabled, and also the two gates 26 and 32 connected to the amplifier. During this period, the charge on the input capacitor is delivered to the second line circuit 11, and the input capacitor 28 becomes charged to a voltage determined by the condition of the second line circuit 11. The gates 21, 26, and 32 are inhibited at the end of the sampling period of the second time slot, and the transfer gate 34 is enabled during the immediately succeeding guard period. The amplified signal from the output capacitor 30 is then transferred to the input capacitor 28, and the transfer gate 34 is inhibited at the end of the guard period.

The first line gate 20 and the sampling gate 26 are then again enabled during the sampling period of the third time slot to transfer the amplified data from the input capacitor 28 to the first line circuit 10, thereby completing the transfer of information in both directions, first from the first line circuit 10 to the second line circuit 11, and then from the second line circuit 11 back to the first line circuit 10. All of the gates are inhibited at the end of the sampling period of the third time slot for the duration of the succeeding guard period, during which time the highway 14 and the capacitors 26 and 32 may be clamped as desired to insure the removal of residual charges to minimize cross talk.

The amplifier 24 is preferably selected as one having a high input impedance so that it does not load the highway 14 and does not significantly affect the charge on the input capacitor 28. The amplifier 24 should also have a low output impedance so that the voltage across the output capacitor 30 during the sampling periods is approximately equal to the voltage across the input capacitor 28 multiplied by the voltage gain of the amplifier, and is substantially independent of the value of the output capacitor 30.

In order that the information may be completely removed from the output capacitor 30 by resonant transfer and delivered substantially entirely to the input capacitor 28 during the times that the transfer gate 34 is enabled, the following relationships must be satisfied:

$$C_{30}=\frac{(A-2)C_{28}}{A}$$

$$\text{desired gain in db}=10\log\frac{C_{28}+A^2C_{30}}{C_{28}}$$

where:

A is the voltage gain of the amplifier 24,
$C_{28}$ is the capacity of the input capacitor 28, and
$C_{30}$ is the capacity of the output capacitor 30 in farads.

The desired gain is known from system requirements in each instance. The values of the other variables may then be determined by selecting a value for one of them arbitrarily, or on the basis of collateral considerations, and mathematically solving the equations for the corresponding values of the other two.

An important advantage of the arrangement according to the invention stems from the dual purpose use of the input capacitor 28, which serves not only to provide an input for the amplifier 24, but also as a temporary storage device for the output signal from the amplifier. Thus, the circuit provides maximum energy conservation because the input signal initially placed on the input capacitor 28 is simply added to the output signal, and not wasted. In addition, there is no need to provide additional gate circuitry for discharging the input capacitor 28 through a separate discharge path.

What is claimed is:

1. A gated amplifier arrangement for a time division multiplex switching system or the like comprising:
(a) an amplifier,
(b) means for connecting the input of said amplifier to the highway of a time division multiplex system,
(c) said means including a gate and an input capacitor between said gate and the input of said amplifier,
(d) an output capacitor connected to be charged by the output of said amplifier,
(e) means for gating the output of said amplifier, and
(f) gate means for controllably discharging said output capacitor into said input capacitor.

2. A gated amplifier arrangement for a time division multiplex switching system or the like comprising:
(a) an amplifier,
(b) means for connecting the input of said amplifier to the highway of a time division multiplex system,
(c) said means including a gate and an input capacitor between said gate and the input of said amplifier,
(d) an output capacitor connected to be charged by the output of said amplifier,
(e) means for gating the output of said amplifier, and
(f) means including a gate for controllably transferring charges by resonant transfer from said output capacitor to said input capacitor during intervals of predetermined duration.

3. A gated amplifier arrangement for a time division multiplex switching system or the like comprising:
(a) an amplifier,
(b) means for connecting the input of said amplifier to the highway of a time division multiplex system,
(c) said means including a gate and an input capacitor between said gate and the input of said amplifier,
(d) an output capacitor connected to be charged by the output of said amplifier,
(e) means for gating the output of said amplifier, and
(f) means including a gate for controllably transferring charges by resonant transfer from said output capacitor to said input capacitor during intervals of predetermined duration.
(g) the values of said amplifier and said capacitors having the following relationships to each other and to the gain in signal strength achieved:

$$C_o=\frac{(A-2)C_i}{A}$$

and $$\text{gain in db}=10\log\frac{C_i+A^2C_o}{C_i}$$

where:
A is the voltage gain of said amplifier
$C_i$ is the capacity, in farads, of said input capacitor, and
$C_o$ is the capacity, in farads, of said output capacitor.

References Cited

UNITED STATES PATENTS

| | | | |
|---|---|---|---|
| 2,927,967 | 3/1960 | Edson | 179—15 |
| 3,117,185 | 1/1964 | Adelaar | 179—15 |

KATHLEEN H. CLAFFY, Primary Examiner

A. B. KIMBALL, Jr., Assistant Examiner

U.S. Cl. X.R.

179—170; 307—243; 320—1; 328—104